United States Patent [19]

Bolin et al.

[11] Patent Number: 4,855,010

[45] Date of Patent: Aug. 8, 1989

[54] APPARATUS FOR GLUING SHEETS OF MATERIAL TOGETHER

[75] Inventors: Göran Bolin, Täby; Jan Sabelström, Huddinge, both of Sweden

[73] Assignee: Dynasonic, Johanneshov, Sweden

[21] Appl. No.: 117,341

[22] Filed: Oct. 27, 1987

Related U.S. Application Data

[63] Continuation of Ser. No. 777,940, Sep. 19, 1985.

[30] Foreign Application Priority Data

Sep. 19, 1984 [SE] Sweden ................................ 8404697

[51] Int. Cl.[4] ........................ B32B 31/04; B32B 31/10; B32B 31/12

[52] U.S. Cl. .................................... 156/497; 156/556; 156/566; 156/578; 156/580

[58] Field of Search ............... 156/556, 566, 578, 580, 156/905, 507, 157, 497; 412/3, 8, 17; 118/261; 271/233, 276

[56] References Cited

U.S. PATENT DOCUMENTS

| | | | |
|---|---|---|---|
| 3,671,363 | 6/1972 | Bruder | 156/556 |
| 4,366,754 | 1/1983 | Sarda | 118/261 |
| 4,376,008 | 3/1983 | Lauri | 156/578 |
| 4,518,379 | 5/1985 | Eldridge | 156/157 |
| 4,549,878 | 10/1985 | Herrin | 156/556 |

FOREIGN PATENT DOCUMENTS 8303909 7/1983 Sweden .

*Primary Examiner*—Marion C. McCamish
*Assistant Examiner*—J. Davis
*Attorney, Agent, or Firm*—Dressler, Goldsmith, Shore, Sutker & Milnamow, Ltd.

[57] ABSTRACT

Apparatus for gluing together at least two individual sheets of material cut to finished dimensions and intended to form parts of a folder consisting of a spine and two covers. The apparatus includes two reception surfaces situated side by side, each defined by aligning members for aligning the two individual sheets in predetermined positions relative to each other. There is provided a first conveyor for moving one sheet away from its reception surface to a gluing device for coating at least one sheet with a glue bead and a second conveyor for moving the second sheet away from its reception surface. At least one of the conveyors is adapted to move one sheet relative to the other so that both sheets overlap each other in the area of the glue bead. A press is provided for pressing together both sheets in said area. The apparatus also includes locating devices which locate the sheets in said positions and are movable relative to each other and together with the respective sheet for maintaining the locations of the sheets during movement of the sheets, their gluing together and pressing together.

7 Claims, 1 Drawing Sheet

1
2
3
4
5
6
8
10
12
12a
12b
14
14a
14b
15
16
17
17a
17b
18
19
20
22
23
24
1a
x
y

APPARATUS FOR GLUING SHEETS OF MATERIAL TOGETHER

This application is a continuation, of application Ser. No. 777,940, filed Sept. 19, 1985.

TECHNICAL FIELD

The present invention relates to an apparatus for gluing together at least two individual sheets of material cut to finished dimensions, and intended to form parts of a folder comprising two covers and a spine, said apparatus including two reception surfaces placed side by side, each defined by aligning members for aligning both individual sheets in predetermined, mutually relative positions, a first conveying means for moving one sheet away from its reception surface to a gluing device for coating at least one sheet with a glue bead, a second conveying means for moving the second sheet away from its reception surface, at least one of the conveying means being adapted for moving one sheet relative the other so that both sheets overlap each other in the area of the glue bead, and a press means for pressing together both sheets in said area.

BACKGROUND ART

It is already known to glue together sheets of the kind mentioned by manually inserting a first sheet in a gluing machine, and after the gluing operation, during which one side of the sheet is coated with a glue bead along one edge thereof, manually turning the sheet and putting it with the glue side upwards on a base, whereafter a second sheet is manually placed on the base while adjusting this sheet relative the first sheet so that the sheets are caused to overlap each other in the area of the glue bead. The operator subsequently uses his fingers to press the upper sheet against the lower sheet in the area mentioned, whereafter the sheets thus glued together are removed from the base.

A machine is shown and described in the Swedish patent application No. 8303909-9, where sheets of the kind mentioned above are automatically moved from two magazines and automatically moved through the machine while the sheets are aligned at different stations, provided with glue, pressed together and fed out from the machine.

The sheets now glued together are inserted in a machine, e.g. of the kind illustrated in the U.S. Pat. No. 4,376,061, for providing the part of the one sheet, which is to form the spine of the finished folder or file, with a hot-melt glue bead and also to achieve crease lines between the spine and covers. After the covers have been folded along the crease lines so that they lie opposite each other, sheets of paper can be inserted between the covers and be caused to engage against the hot-melt glue bead on the inside of the spine, and the folder or file is placed on a heated base in an apparatus, e.g. of the kind illustrated in the U.S. Pat. No. 4,367,116, so that this bead melts and the edges of the sheet adhere to the inside of the spine.

Manual handling of both sheets in conjunction with gluing the latter is very time-consuming. Furthermore, the manual handling results in a relatively poor product with regard to quality, since the alignment of the sheets relative each other in the gluing area cannot be made exactly, and since the compressive force in this area varies along the length of the bead.

The fully automatic handling of both sheets in conjunction with gluing is rapid, but requires a complicated and expensive machine. Furthermore, the risk of operational disturbances is large. It has also been found that the alignment of the sheets during the different operations will not be exact, and that the aligning means must be reset for producing differently sized folders.

DISCLOSURE OF INVENTION

It is an object of the present invention to achieve an apparatus, which to a large extent makes use of the advantages of the automatic machine, but is much simpler and thereby cheaper, as well as being more operationally reliable than the automatic machine. Furthermore, the inventive apparatus is so constructed that folders of different sizes can be produced without any resetting of the aligning members being necessary.

This object is achieved by the apparatus in accordance with the invention having been given the distinguishing features disclosed in the characterizing portions of the claims.

PREFERRED EMBODIMENT

Figures 1, 1A, 1B, 1C, 1D, 2:
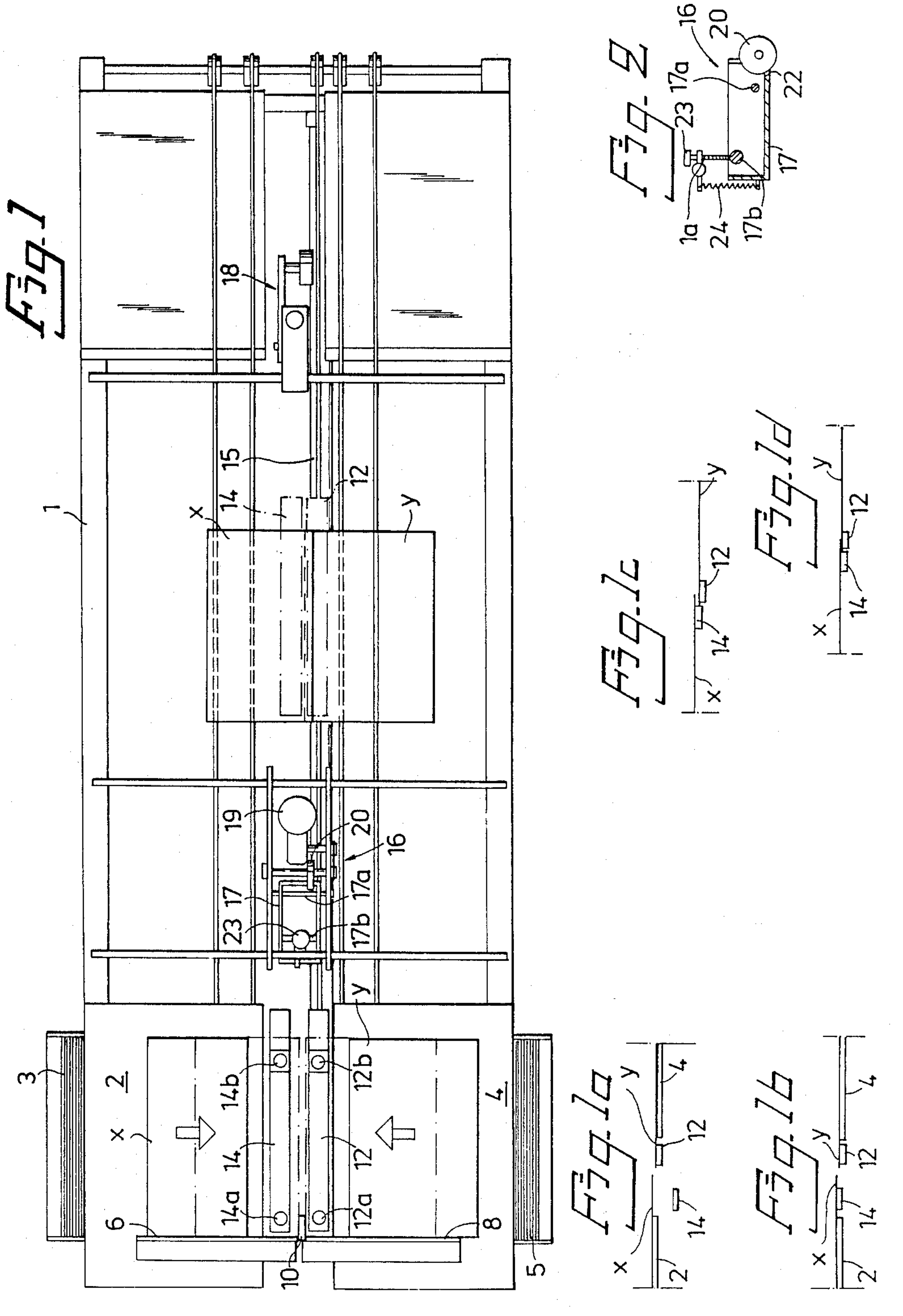
FIG. 1 is a schematic plan of the apparatus in accordance with the invention.
FIGS. 1*a*–1*d* are schematic elevations of parts in different positions, seen from the left in FIG. 1, these parts being included in the apparatus according to this Figure.
FIG. 2 is a side-elevation of a gluing device included in the apparatus according to FIG. 1.

The apparatus in accordance with the invention includes a stand 1 placed on a floor, the stand carrying all the parts included in the apparatus. Two magazines 3 and 5 are situated at the sides of the apparatus input and one of the magazines 3 containing a quantity of sheets made from plastics and the other 5 a quantity of paper sheets, both types of sheet resting with their edges on the bottom of the magazines. The plastics and paper sheets are equally as long in the longitudinal direction of the apparatus, but the paper sheet is somewhat wider than the plastic one, since the paper sheet shall not only constitute a cover in the finished folder or file but also a spine, which is formed in a later work operation by providing the paper sheet with crease lines and creasing it along these so that its cover portion will be situated directly opposite the plastic sheet, which thus forms the other cover, which is exactly the same size as the first cover. The above mentioned U.S. Pat. Nos. 4,367,061 and 4,367,116 describe exhaustively how the crease lines are formed, how the folders are provided with glue bead and how the covers are put in a finished condition.

When a plastics sheet and a paper sheet are to be glued together in the apparatus in accordance with the invention, an operator sitting at the left hand end of the apparatus in FIG. 1 takes the outermost plastics sheet in the magazine 3 with the left hand and the outermost paper sheet in the magazine 5 with the right hand. The operator places these sheets x and y on two fixed tables 2 and 4, situated side by side, of which the upper table 2 in FIG. 1 is situated somewhat above the lower table 4, as will be seen from FIG. 1*a*, and aligns the sheets in the longitudinal direction of the apparatus against bars 6, 8 and at right angles to this direction against a common bar 10 placed between both sheets. After being aligned in this way, the sheets x and y assume the positions, illustrated furthest to the left in FIG. 1 with partially chain-dotted lines, where the distance between the sheets is predetermined and exactly corresponds to the width of the bar. Since the bar 10 is placed between the sheets x and y, the widths of the sheets, and thereby the widths of the folder spines (at right angles to the direction of movement of the sheets through the apparatus) may be selected optionally without any parts of the apparatus needing to be set, although it is ensured that the finished folder will have equally as large covers, since the sheets are cut to finished dimensions before their insertion in the inventive apparatus.

When the sheets x and y have taken up the last-mentioned aligned positions on the tables 2 and 4, the one to the left 2 being somewhat above the one to the right 4, the operator actuates an unillustrated switch causing a first and a second conveying means, implemented as carriages 12 and 14 situated side by side and between the tables 2 and 4, to be moved upwards from their lower end positions illustrated in FIG. 1*a* to the positions illustrated in FIG. 1*b*, where the upper surfaces of the carriages are in the same plane as the tables and in contact with the undersides of the sheets.

An unillustrated suction means, connected to blocks having holes 12*a*, 12*b* and 14*a*, 14*b* mounted on the carriages 12 and 14, is actuated simultaneously with the carriages by the switch, and causes a negative pressure in the blocks whereby the sheets are caused to maintain their mutual, relative location on the carriages when the upper surfaces of the latter come into contact with the sheets. The holed blocks are displaceably mounted on the carriages 12 and 14 in the longitudinal direction of the latter to enable their being set in different positions adjusted to different lengths of the sheets x and y.

The carriages 12 and 14 with their respective sheets x and y located thereon are moved in parallel and at the same rate to the right in FIG. 1 by a piston-cylinder means 15 indicated on this Figure. The area on the upper side of the sheet y, which is to be coated with glue, thus passes immediately under a gluing device 16 mounted in the stand 1, the sheet x passing to one side thereof.

The gluing device 16 includes a container 17 provided with a shaft 17*a*, pivotably attached to the stand 1, and a gluing wheel 20 which is continuously rotated anticlockwise in FIG. 2 by a motor 19 with a peripheral speed substantially corresponding to the speed at which the carriages 12 and 14 are moved in the longitudinal direction on the apparatus. The gluing wheel 20 is partially inserted in a slot in the container 17 with a small spacing between wheel and slot walls so that liquid glue in the container cannot leave the container otherwise than via a gap 22 between the periphery of the wheel and an end edge of the slot. The size of this gap 22 is regulatable with the aid of a means including a screw 23 in a threaded hole in a part 1*a* of the stand 1, with the lower end of the screw engaging against a shaft 17*b* in the container 17, and a tension spring 24 mounted between the container and the stand part 1*a*. When the screw 23 is screwed in, the container 17 is pivoted anticlockwise about the shaft 17*a* against the bias of the spring 24, causing the gap 22 to decrease, and when the screw is screwed out the container is pivoted clockwise to increase the gap. The reason for having the gap 22 regulatable is that the thickness of the glue coating coming on the gluing wheel 20 may be varied, so that an optimum thickness of the glue bead on the sheet y may be obtained. The width of this glue bead, which is constant, corresponds to the thickness of the gluing wheel 20, and is less than the later described overlap between the sheets x and y.

After the gluing wheel 20 has deposited the glue bead on the upper side of the sheet y along its upper edge portion according to FIG. 1, by rolling over the sheet with the upper surface of the carriage 12 as platen, the sheets x and y continue to move to the right in FIG. 1 with retained location on the carriages 12 and 14. Approximately in the position of the sheet in FIG. 1 under which FIG. 1*c* is situated, the carriage 14 is moved towards the carriage 12 so that the carriages and sheets assume the positions illustrated in FIG. 1*c*, whereby the sheet x overlaps the sheet y by a distance somewhat exceeding the width of the applied glue bead just mentioned. Immediately afterwards the carriage 14 with the sheet x is moved downwards so that the sheets x and y come into contact and adhere to each other, as illustrated in FIG. 1*d*.

On continued movement of the carriages 12 and 14 to the right in FIG. 1, with retained location of the sheets x and y thereon, a press means 18 equipped with a wheel is brought into the overlapping area and as they move presses the sheets together to a final union in the overlapping area as the wheel rotates with their movement to press the sheets against the upper surface of the carriage 12.

The previously mentioned suction means is not disabled until after the sheets have passed the press means, this disablement taking place, for example, by one of the carriages actuating a photo electric cell or a microswitch, whereon the glued-together sheets are released from the carriages, the carriages then being returned to the positions illustrated in FIG. 1*a*, so that they may carry out a new operation cycle for gluing together two further sheets taken out from the magazines 3 and 5.

It should be understood that the embodiment described above and illustrated on the drawings can be modified without departing from the inventive concept, and is only to be regarded as an example of one of several possible embodiments.

The invention is thus only limited by the disclosures in the claims.

What is claimed as new and desired to be secured by Letters Patent of the United States:

1. Apparatus for longitudinally conveying and gluing at least a first and second sheet of material cut to finished dimensions and intended to form parts of a folder consisting of a spine and two covers, said apparatus including a gluing device disposed at a fixed location on said apparatus, two reception surfaces situated side by side, each defined by fixed aligning members for aligning the first and second sheets in longitudinal alignment relative to each other, a first conveying means for moving one sheet in a longitudinal direction away from its reception surface and aligning member to said gluing device for coating said first sheet with a longitudinal glue bead, a second conveying means for moving the second sheet in a longitudinal direction away from its reception surface and aligning member synchronously with the first sheet at least one of the conveying means being adapted for moving one sheet laterally relative to the other so that both sheets overlap in the area of the glue bead, press means for pressing together both sheets in said glue bead area, and location maintaining means associated with each of the first and second conveying means for positively fixing the sheets in longitudinal alignment and displaceable relative to each other and together with the respective sheets for positively retaining the longitudinal alignment of the sheets during their movement, gluing and pressing together.

2. Apparatus as claimed in claim 1, wherein the location maintaining means are arranged to positively fix the sheets on their respective conveying means.

3. Apparatus as claimed in claim 2, wherein the location maintaining means are openings made in the conveying means and connected to a suction means.

4. Apparatus as claimed in claim 1, wherein each reception surface comprises a fixed table as well as an adjacent upper surface on one of the conveying means at least one of the conveying means being displaceable between a position in which its upper surface is under or in substantially the same plane as the table surface and a position in which its upper surface is substantially in the same plane as, or above the table surface.

5. Apparatus as claimed in claim 1, wherein the aligning members are at least partially situated between the first and second sheets and against which the sheets are arranged to be moved and retained manually before the location maintaining means.

6. Apparatus as claimed in claim 1, wherein the gluing device is mounted vertically above the sheet coated with glue bead, and includes a container containing liquid glue and provided with an opening situated under the glue surface, the opening accommodating a rotating glue entraining wheel while leaving a regulatable gap between the periphery of the wheel and an edge of the opening.

7. Apparatus as claimed in claim 1, wherein one of the conveying means forms a platen for the sheets for the gluing as well as the pressing together.

* * * * *